United States Patent [19]
Naito

[11] 3,967,796
[45] July 6, 1976

[54] AUTOMATIC RETURN DEVICE FOR USE IN CASSETTE TAPE RECORDER

[75] Inventor: Kyohei Naito, Tokyo, Japan
[73] Assignee: Shinwa Shoko Co., Ltd., Tokyo, Japan
[22] Filed: Sept. 19, 1974
[21] Appl. No.: 507,589

[30] Foreign Application Priority Data
Oct. 2, 1973  Japan.............................. 48-110839

[52] U.S. Cl............................... 242/189; 242/208
[51] Int. Cl.².................. B65H 59/38; B65H 63/02; G03B 1/04; G11B 15/32
[58] Field of Search ........... 242/187, 190, 204, 206, 242/208, 209, 57; 360/73, 93, 96

[56] References Cited
UNITED STATES PATENTS
3,567,154  6/1968  Bradt et al......................... 242/190
3,759,464  9/1973  Sato.................................. 242/188

Primary Examiner—Leonard D. Christian
Attorney, Agent, or Firm—George B. Oujevolk

[57] ABSTRACT

The present invention relates to an automatic return device for use in a cassette tape recorder. A mechanism for automatically returning a cassette tape using increased tape tension which is caused by rolling up the tape reels is disposed in the cassette housing. The entire operation is done mechanically without any electrical action so that a high stability is attained with regard to variations in ambient temperature or humidity.

1 Claim, 2 Drawing Figures

AUTOMATIC RETURN DEVICE FOR USE IN CASSETTE TAPE RECORDER

BACKGROUND OF THE INVENTION

The present invention relates to a return device for use in a cassette tape recorder and more particularly to a mechanical return device using tape tension.

BRIEF REVIEW OF THE PROBLEM

Generally, a cassette tape is recorded on the upper portion of the tape or A side and the lower portion or B side thereof. For playing the recorded tape, the tape is loaded in a tape recorder, and the switch is turned to the on position of the recorder to have the tape play in the cassette. When the tape has been completely rolled up in one direction, a lever is pressed by the increased tape tension, thereby automatically stopping the rotary driving of the tape recorder and shutting off the power supply simultaneously.

To playback the A-side recording on the tape rolled up in one direction, it is necessary to rewind the tape by actuating a fast-reverse pushbutton to turn on a switch. And when the tape recorder is installed inside an automobile, it is dangerous while driving the automobile.

In an attempt to eliminate these defects, the inventor has provided a device capable of returning the tape automatically to the former state without the need of touching the tape recorder.

SUMMARY OF THE INVENTION

An object of the invention resides in providing an automatic return device for use in a tape recorder to reverse a rotatory driving means mechanically by utilizing increased tape tension occurring when a cassette tape has been rolled up to the end in one direction.

The rotatory driving means is reversed merely by pure mechanical operation without any electrical action so as to eliminate variations resulting from ambient temperature or humidity, thereby achieving reliability as well as safety and service life which are requirements for the tape recorder's function and to avoid wasteful consumption of power.

DETAILED DESCRIPTION OF THE INVENTION

Figure 1:
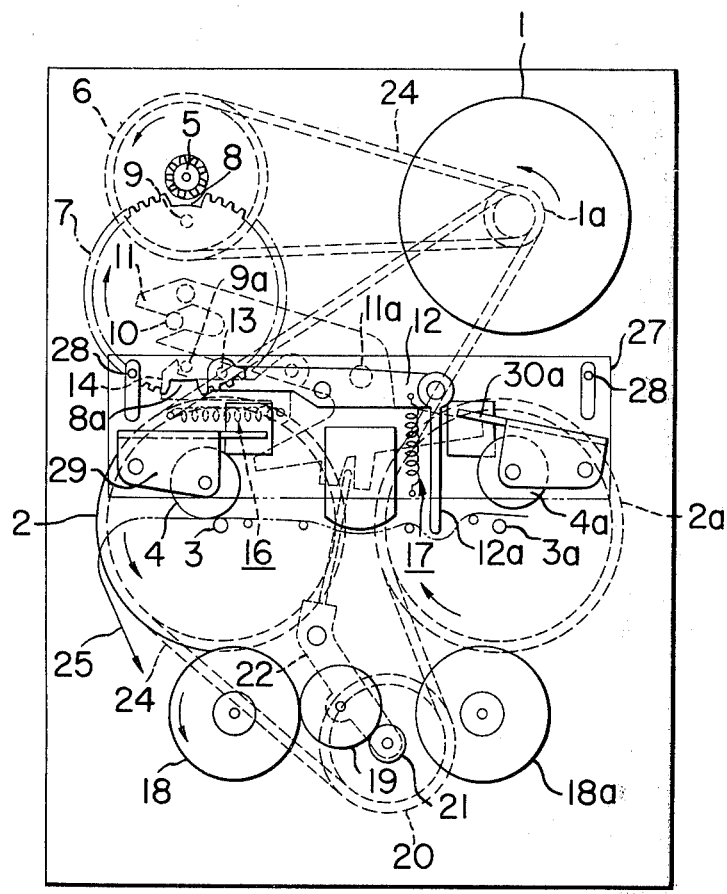
FIG. 1 is a front view of an automatic return device for use in a tape recorder embodying the present invention.

Hereinafter an embodiment of the present invention will be described in detail with reference to the accompanying drawings, in which: (1) is a motor; (2, 2a) are flywheels of light alloy, on whose axes wear-resisting capstan shafts (3, 3a) are provided; (4, 4a) are pinch rollers made of metal or synthetic rubber and pivoted to frames (29, 29a) respectively in a rotatable manner on a chassis (28). The frames (29, 29a) are elastically energized by means of springs (not shown) so that the ends (30, 30a) of frames (29, 29a) butt against actuating parts (31, 31a) of a reverse lever (11), which will be described afterward; (5) is a metallic or plastic gear, whose shaft has mounted thereon a metallic or plastic pulley (6) coaxially; (7) is a metallic or plastic gear having notches (8, 8a) on the circumference thereof and being so disposed as to engage with the gear (5) when rotated; (9, 9a) are pins disposed symmetrically on one side of the gear (7); and (10) is a pin provided eccentrically between the center of gear (7) and one of the pins (9, 9a). The notches (8, 8a) on the circumference of gear (7) are positioned diametrically opposite each other. (11) is a metallic reverse lever with one end engaged with the pin (10) while other end formed into actuating parts (31, 31a) is engageable with the ends (30, 30a) of frames (29, 29a) which hold the pinch rollers (4, 4a); (11a) is the fulcrum of the reverse lever (11); (12) is a sensing lever having a plastic sensing part (12a) and being pivoted at a fulcrum (15) with one end connected to a lock lever (14) through a coupling pin (13); (14a) is a fulcrum of the lock lever (14); (16) is a pull spring for the lock lever (14); (17) is a pull spring for the sensing lever (12); (18, 18a) are reel tables; (19) is a roller; (20) is a roll-up pulley; (21) is a roll-up roller disposed coaxially with the roll-up pulley (20) and connected to a roller arm (22) which serves to bring the roll-up roller (21) into intimate engagement with the reel table (18). The roller arm (22) is rotatably pivoted at a pin (32) as illustrated, and a belt (24) threading through the roller (20) serves to push the roller arm (22) leftward. (23) is an elastic part extending at the end of roller arm (22) and being kept in engagement with a recess formed at the end of reverse lever (11); (24, 24) are belts, one threading through the pulley (1a) mounted coaxially with the motor (1) and the gear (5), while the other threading through the pulley (1a), the flywheels (2, 2a) and the roll-up pulley (20); (25) is a cassette tape; (26) is a chassis; (27) is a playback head mounting plate; and (28) is a guide pin.

Figure 2:
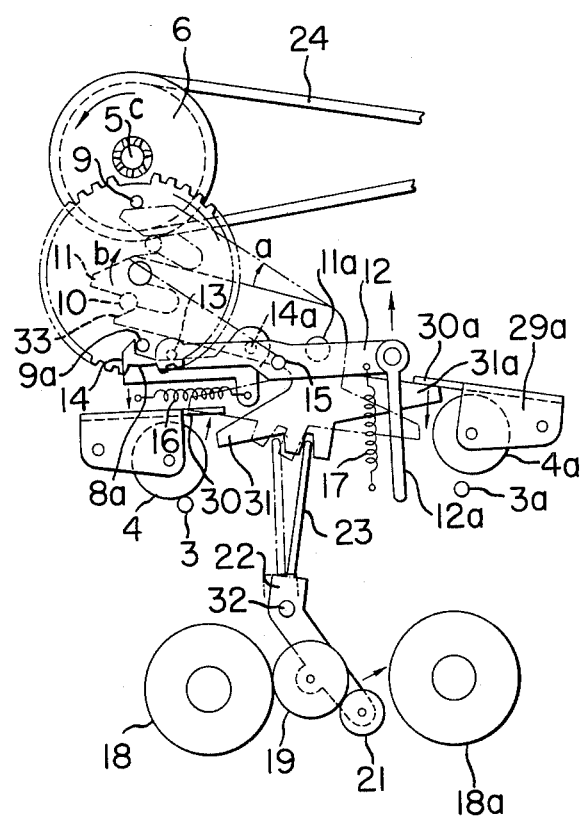
FIG. 2 is a front view of a principal portion of the device shown in FIG. 1 with some components removed to illustrate the operation of the inventive concept.

How a description will be given on the operation of the present invention. In the state where a known cassette tape (25) has been rolled up to the end in one of the reels, the sensing part (12a) of sensing lever (12) comes to be pressed with increased tension of the tape (25) tensed horizontally as illustrated by the two-dot chain line, so that the sensing part (12a) is pushed upward in the drawing to rotate the sensing lever (12) counterclockwise around the fulcrum (15) as shown in FIG. 2. As a result, the lock lever (14) is pushed downward by the coupling pin (13) so as to be disengaged from the pin (9a). When unlocked from the pin (9a), the reverse lever (11) is shifted in the direction shown by the arrow a, and an inclined surface (33) at the end of reverse lever (11) pushes the pin (10) in the direction of the arrow b through slide contact therewith. The shift of pin (10) in the direction b causes the gear (7), where the pin (10) is mounted, to start clockwise rotation. So that, the gear (7) comes into engagement with the gear (5) which is positioned in the notch (8) of gear (7) and the rotating in the direction c. Consequently, the gear (7) engaged with the gear (5) is rotated in the direction of the arrow b. As a result, the reverse lever (11) holding the pin (10) of gear (7) is rotated clockwise in accordance with the rotation of gear (7) as shown by the two-dot chain line. And simultaneously, one of the two pinch rollers (4, 4a) being in engagement with the other ends (31, 31a) of reverse lever (11), one roller (4) is rotated in the direction to move away from the capstan shaft (3), while the other roller (4a) is rotated in the direction to be pressed against the capstan shaft (3a). In this case, a rotatory force is applied to the roller arm (22) by the engaging part of reverse lever (11) so as to rotate the arm around the pin (32). By such operation, the contact between the reel table (18) and the roll-up roller (21) through the roller (19) is shifted to the contact between the reel table (18a) and the roll-up roller (21). This shift causes a roll-up torque by means of a clutch (not shown) mounted in the roll-up pulley (20). When the gear (7) is rotated 180°, the foregoing operation is terminated, and simultaneously the tape (25) starts running in the reverse direction. Thus, the gear (5) is fitted to the notch (8a) of gear (7), and the lock lever (14) is brought into engagement with the pin (9) to stop the rotation of gear (7). Thereby, the tape (25) is kept running in reverse. While the tape is running in the reverse direction, the gear (5) is idle rotation.

At each termination of rolling up the tape (25) to the end, the gear (7) is rotated 180° by the foregoing operation to effect automatic return rolling of the tape (25).

I claim:

1. In a cassette type tape recorder, an automatic tape return arrangement, comprising in combination:
   a. a chassis panel with chassis support means (28) towards the center of said panel;
   b. pivoted frame means (29, 29a) with inner end sections (30, 30A) supported on said support means (28);
   c. first and second pinch rollers (4, 4a) pivoted to said frame means (29, 29a);
   d. first and second capstans (3, 3a) disposed to contact with said pinch rollers (4, 4a) and so disposed as to define together with the pinch rollers a loose passage for a tape (25);
   e. drive means (1) towards one side of said panel center coupled to at least one of said capstans to rotate said capstan;
   f. a first gear (5) also towards said one side of said panel center likewise driven by said drive means (1);
   g. a second gear (7) having opposed circumferential notches (8, 8a) to receive said first gear (5) but in drive contact with said first gear (5) when said first gear (5) is not in one of said notches, said second gear having outer pins (9, 9a);
   h. an eccentric pin (10) on said second gear (7), a reverse lever (11) with one end engaged to said eccentric pin (10) and the other end defining actuating parts (31, 31a) engaging the end sections (30, 30a) so as to bring the first or the second pinch roller (4, 4a) into engagement with the first or second capstan (3, 3a), said reverse lever (11) having a fulcrum (11a) and an engaging part between said actuating parts;
   i. a sensing lever (12) with a sensing part (12a), so disposed with respect to said tape defined passage as to be in contact with said tape (25) when said tape is tensioned, said sensing lever (12) having a fulcrum (15) and one coupling end, a lock lever (14) with a fulcrum (14a) coupled to said coupling end, said lock lever being disposed to engage one of said outer pins (9, 9a); and,
   j. first and second reel tables (18, 18a) on the other side of said panel center, a roller arm (22) disposed pivotally on a pivot pin (32) between said reel tables (18, 18a) said roller arm (22) having an inner end towards said panel center, a center part, and an outer end, a roll-up pulley (20) driven by said drive means (1) on said outer end with a roll-up roller (21) coaxially connected thereto, a contact roller (19) on said roller arm center part, and an arm extension (23) extending from said roller arm inner end towards said panel center into said reverse lever engaging part.

* * * * *